United States Patent
Jatti et al.

(10) Patent No.: US 11,729,474 B2
(45) Date of Patent: Aug. 15, 2023

(54) SYSTEM AND METHOD FOR ENSURING MEDIA APPLIANCE STABILITY

(71) Applicant: ARRIS ENTERPRISES LLC, Suwanee, GA (US)

(72) Inventors: Vinod Jatti, Bangalore (IN); Murali S. Sahasranaman, Bangalore (IN); Virendra Singh, Bangalore (IN)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 17/361,900

(22) Filed: Jun. 29, 2021

(65) Prior Publication Data

US 2022/0046328 A1    Feb. 10, 2022

Related U.S. Application Data

(60) Provisional application No. 63/062,673, filed on Aug. 7, 2020.

(51) Int. Cl.
*H04N 21/6332* (2011.01)
*H04N 21/4425* (2011.01)

(52) U.S. Cl.
CPC ..... *H04N 21/6332* (2013.01); *H04N 21/4425* (2013.01)

(58) Field of Classification Search
CPC .............. H04N 21/6332; H04N 21/4425
See application file for complete search history.

(56) References Cited

U.S. PATENT DOCUMENTS

| | | | |
|---|---|---|---|
| 2007/0050836 A1* | 3/2007 | Stanek | H04N 21/258 725/74 |
| 2009/0100492 A1* | 4/2009 | Hicks, III | H04N 21/6156 725/127 |
| 2009/0276655 A1* | 11/2009 | Quere | H04N 21/4432 714/48 |
| 2010/0071011 A1* | 3/2010 | Addair | H04N 21/6582 725/107 |
| 2013/0198767 A1* | 8/2013 | Wang | H04N 21/6583 725/14 |
| 2016/0285717 A1* | 9/2016 | Kim | H04L 41/0631 |

* cited by examiner

*Primary Examiner* — Jefferey F Harold
*Assistant Examiner* — Alexander Boyd
(74) *Attorney, Agent, or Firm* — Panitch Schwarze Belisario & Nadel LLC

(57) ABSTRACT

A system and method for automatically determining if certain operational states of a plurality of networked media appliances are causally connected with those appliances becoming unstable and/or having a software crash. Once these certain operation states are identified, a command prohibiting each of the networked media appliances from entering the identified state is generated and transmitted to the media appliances. The generated commands effectively insulate the media appliances entering the prohibited state, thereby eliminating a possible cause of a software crash without requiring the appliances to undergo a software update or the installation of a software patch.

18 Claims, 4 Drawing Sheets

SYSTEM AND METHOD FOR ENSURING MEDIA APPLIANCE STABILITY

CROSS-REFERENCE TO RELATED APPLICATION

This application claims the benefit of U.S. Provisional Patent Application No. 63/062,673, filed Aug. 7, 2020, which is incorporated by reference herein in its entirety.

BACKGROUND OF THE INVENTION

Media gateway appliances ("MGAs"), such as set-top boxes associated with cable, optical and satellite broadband systems, serve as the primary conduit and repository for data, voice and video communications in a vast number of business and residential environments. Consequently, loss of service due to a gateway appliance experiencing a software crash or requiring a system re-boot can, at the very least, result in a significant inconvenience for users.

MGA software crashes and/or conditions requiring a re-boot are often attributable to system instabilities that occur as a result of the inability of the MGA's software to execute a particular use case requested by a user. For example, assume that a particular MGA is running a given software provided by a multiservice operator ("MSO"). Each time a user attempts to view cable channel A via the MGA, while utilizing the MGA's digital video recorder functionality to capture the content upon a second cable channel B, the software becomes unstable and requires the MGA to be rebooted. The operation requested by the user is valid, but for some unforeseen software/hardware bugs, the MGA becomes unstable.

It is very likely that a significant number of similar MGAs located at other residences and businesses linked to the MSO's network are running the very same software as MGA described above. It is also very likely that these other MGAs would also become unstable if users attempted to view channel A while recording channel B. Of course, once the MSO becomes aware of the existence of this instability (quite likely via customer complaints and field technician reports), an effort to correct the software could be undertaken. Unfortunately, such corrective measures can take a significant amount of time, and even after a proper software patch or fix is devised, it may be many months until a new version of MGA software is released by the MSO and downloaded to the deployed MGAs. In the interim, users of the MGAs will be at risk of incurring a temporary loss of service if they happen to duplicate the particular unstable MGA operational state (viewing channel A while recording channel B).

It would therefore be desirable to provide for an automated system and method to identify operational states that result in MGA instabilities and provide a means of insulating other similarly configured MGAs from entering into the identified states.

BRIEF SUMMARY OF THE INVENTION

A system and method for automatically determining if certain operational states of a plurality of networked media appliances are causally connected with those appliances becoming unstable and/or having a software crash. Once these certain operation states are identified, a command prohibiting each of the networked media appliances from entering the identified state is generated and transmitted to the media appliances. The generated commands effectively insulate the media appliances entering the prohibited state, thereby eliminating a possible cause of a software crash without requiring the appliances to undergo a software update or the installation of a software patch.

BRIEF DESCRIPTION OF THE DRAWINGS

The aspects, and advantages of the present invention will become better understood with regard to the following description, appended claims, and accompanying drawings in which:

DETAILED DESCRIPTION

Figure 1:
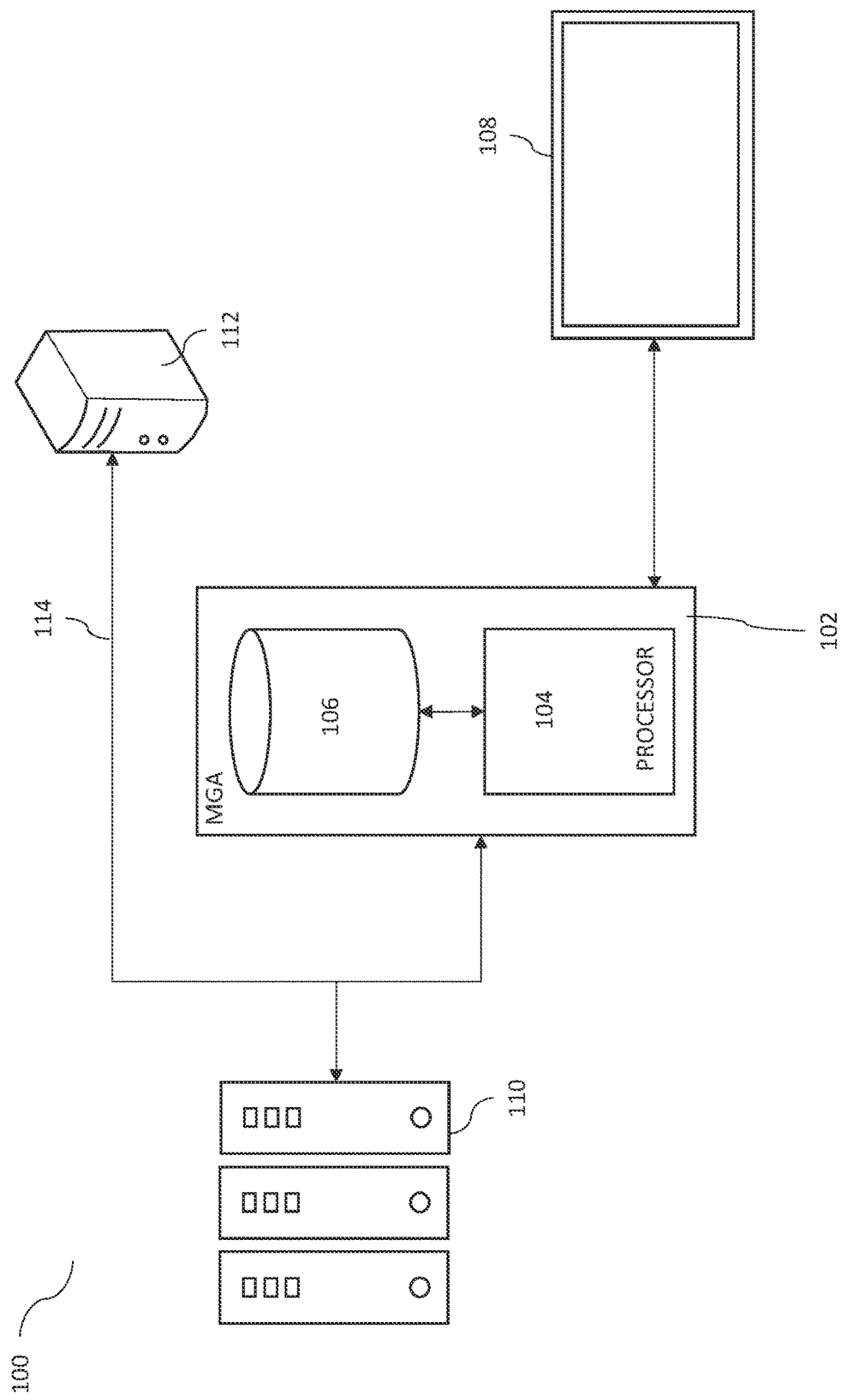
FIG. 1 is a is a functional block diagram of a system supporting a preferred embodiment of an automatic system for recording viewer reactions.

FIG. 1 is a functional block diagram of a preferred embodiment of a system (100) including MGA 102 and enabling the automatic detection, recording and reporting of operational conditions associated with MGA destabilization. of viewer reaction to a video event. As shown, system 100 comprises MGA 102 which is adapted to manage the transmission, reception, recording, storage and viewing of multiple types of digital media and digital communications. MGA 102 includes processor 104 and memory 106. Processor 104 is also shown to be in communication with television 108. In addition, MGA 102 is linked to multiservice operator ("MSO") 110 and to server/repository 112 via broadband connection 114.

Processor 104 is adapted to execute a media management application that, in response to commands received from a user or the MSO, controls the viewing, routing, storage and security of the digital media transceived via and/or stored within MGA 102. Memory 106 provides a repository for the media management application, user-specific information (network and personal passwords, etc.), and digital media content. In addition, the media management program provides for the collection and storage (within memory 106) of metadata reflective of MGA 102 operation. This metadata would comprise a record of the operational status of MGA 102, detailing the state of the appliance. Such metadata could include, without limitation, information indicative of:
- content being recorded;
- data being received;
- content being retrieved and played from memory;
- commands received from a user;
- commands received from the MSO;
- content received via one or more tuners;
- type of content being streamed, accessed,
- played or recorded (MPEG-encoded video, audio, jpeg, etc.);
- bit rate at which content is being streamed, accessed, played or recorded; or
- data anomalies (missing or discontinuous timestamps, etc.

The generation of such metadata within a processor-controlled system such as MGA 102 is well-known in the art and will not be discussed in any further detail.

Figure 2:
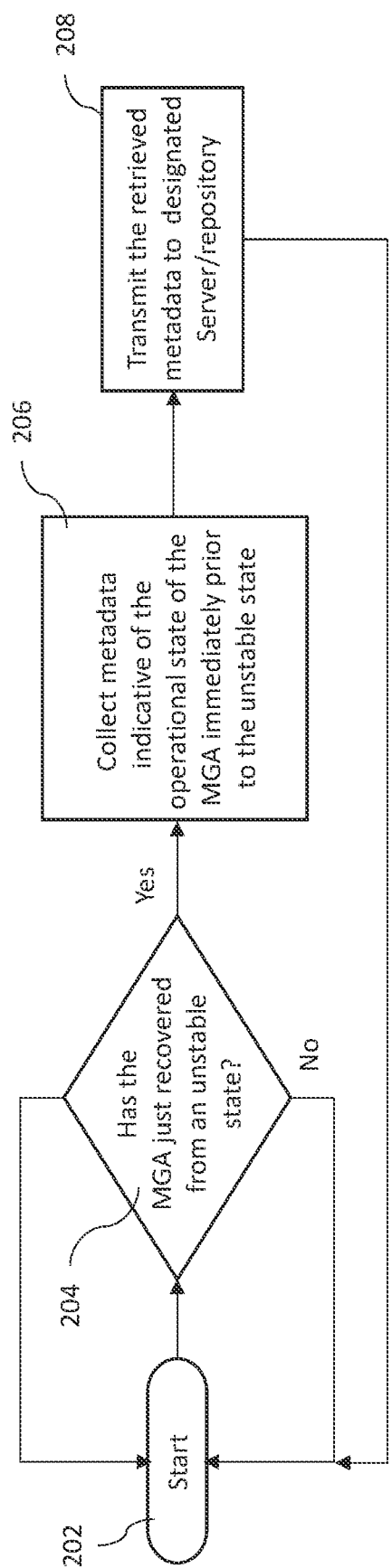
FIG. 2 is a process flow diagram of steps associated with a media gateway device supporting a preferred embodiment of an automatic system for recording viewer reactions.

FIG. 2 provides a flow diagram of the process carries out within MGA 102 after recovering from an unstable state that resulted in a software crash or other condition requiring system restart or reboot. Once MGA determines that it has recovered from an unstable state (steps 202 and 204), processor 104 collects the metadata reflecting the state and operation of MGA just before the occurrence of the unstable state (step 206). This metadata provides the best available representation of the MGA state that likely gave rise to the instability/crash. Processor 104 transmits the collected metadata to designated server/repository 112 via broadband link 114 (step 208). Server/Repository 112 comprises at least one processor and a memory.

Figure 3:
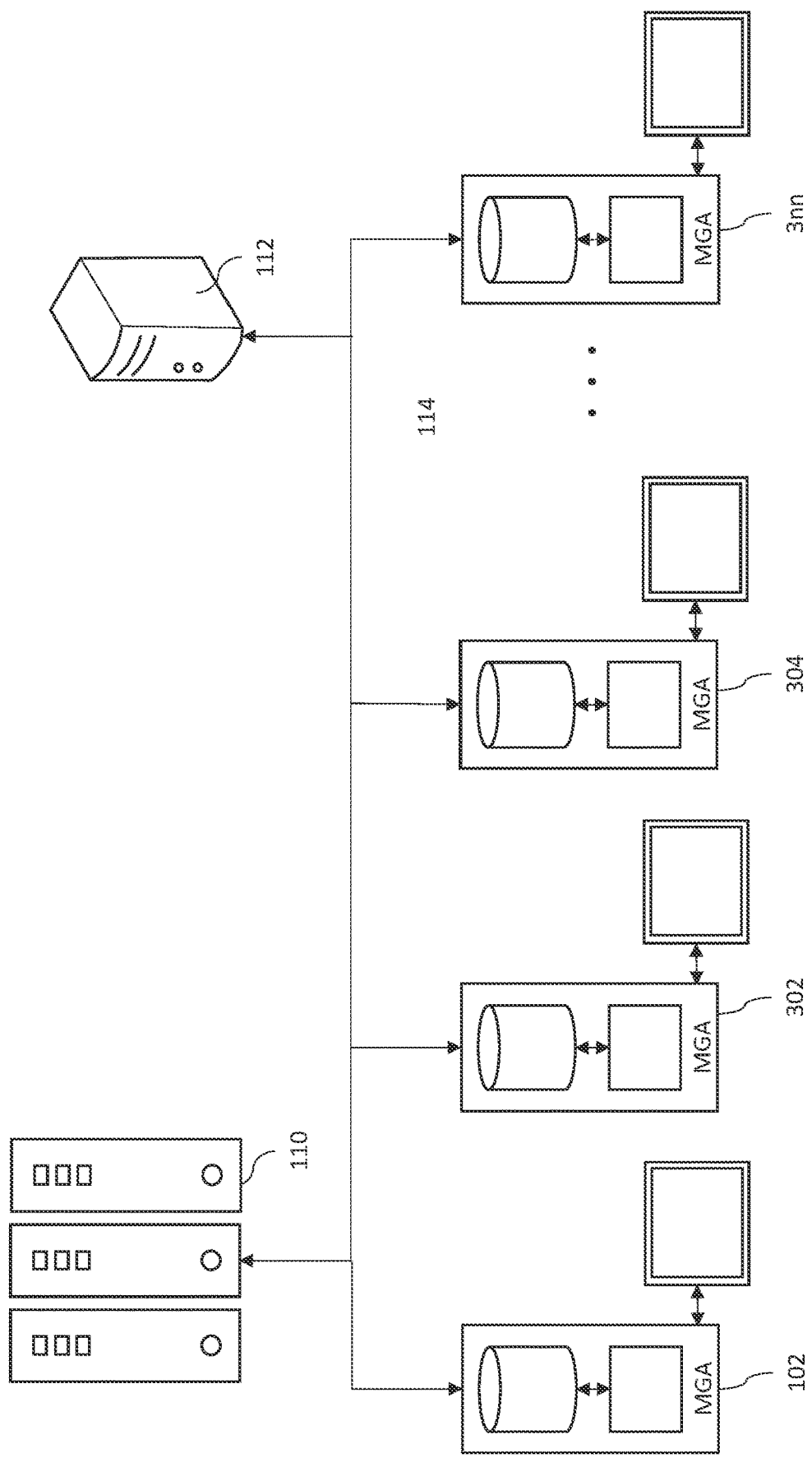
FIG. 3 is a functional block diagram of a system comprising a plurality of media gateway appliances supporting a supp

As shown in FIG. 3, other similarly configured MGAs (302, 304 . . . 3nn) within the MSO's network are also connected to headend 110 and/or server/repository 112 via broadband link 114. When any of these similarly configured MGAs recovers from an unstable state, the processor within it collects the metadata reflecting the state and operation of that MGA just before the instability and transmits it to designated server/repository 112.

Figure 4:
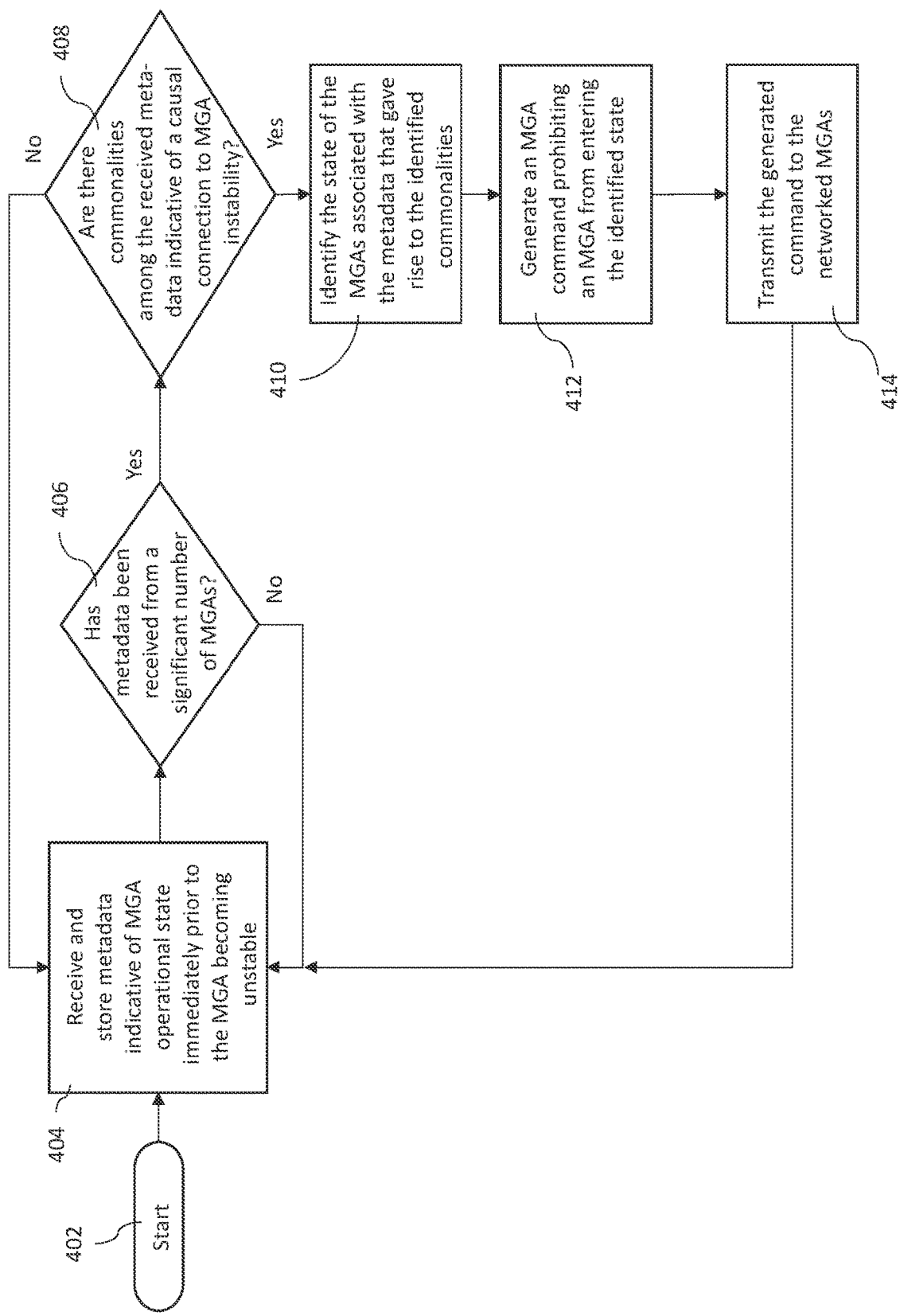
FIG. 4 is a process flow diagram of steps associated with implementing a preferred embodiment of an automatic system for recording viewer reactions.

Upon reception at server/repository 112 (see FIG. 4, steps 402 and 404), the metadata is stored by the server/repository processor in the server/repository memory. The server/repository processor then makes a determination as to whether metadata from a significant number of MGAs has been received by server/repository 112 (step 406). This determination can be based upon the received metadata transmissions from unique MGAs reaching a predetermined threshold, or on the basis of a particular percentage of the total number of networked MGAs having transmitted metadata, or upon any arbitrary threshold set by the MSO. Once the significant number of unique metadata transmissions has been received and stored, an analysis of the received MGA metadata transmissions is performed by the server/repository processor (step 408). This analysis looks for commonalities among the metadata received from the various MGAs. If commonalities are detected among the received metadata transmissions, the particular state of the MGAs associated with the common metadata is identified by the server/repository processor as undesirable for likely having caused or contributed to the unstable MGA state (step 410). If no such commonalities are found, the process continues from step 408 to step 404, and additional MGA metadata is collected.

An instruction to prohibit MGA from accepting commands that would place it into the identified undesirable state is created (step 412) and transmitted to each of the MGAs in the MSO's network (step 414) by the server/repository processor. This instruction can be created by one or more technicians, or by an automated system implemented upon a processor associated with the server/repository. For example, if a significant number of MGAs provided metadata to server/repository 112 indicating that an unstable state was caused immediately following the utilization of one tuner to view a streaming video on channel C, while recording a streaming video received on channel D via a second tuner. This operation of simultaneously viewing one channel and recording another should be a perfectly acceptable operation for an MGA to perform. However, the collected meta data has indicated that the software appears to have a bug that causes the MGA to become unstable if the particular channels involved are C and D, respectively. Consequently, a command prohibiting MGAs from specifically that particular operation would be created and transmitted to the networks MGAs. If a particular user was employing their MGA to record streaming video received on channel D, and then attempted to simultaneously view streaming video on channel C, the system would generate a message informing the user that tuning to channel C is presently prohibited. This message could be provided as an on-screen message via the particular display the user was attempting to utilize to view channel D.

The real-time collection of metadata from the population of networked MGAs enables the system to identify particular states of operation, as they become evident within the network of MGAs, that give rise to instability, and to generate and provide proactive instructions prohibiting MGAs from being placed into such states going forward. These proactive instructions require no updating or patching of the software running on the MGAs. There is no need to download a large software update that could result in an interruption of service to a user. The transmitted instruction simply prohibits a very specific state of MGA operation from being executed.

Although the invention herein has been described with reference to particular embodiments, it is to be understood that these embodiments are merely illustrative of the principles and applications of the present invention. For example, any number of remote or cloud-based storage systems could be utilized for storage of MGA metadata, including storage within or co-located with the MSO headend. In addition, the processor and/or memory associated with a given MGA could be located external to the MGA, including in a cloud or networked environment. In addition, the MGAs described above can be stand-alone devices such as a set-top boxes, or integrated into another system or device such as a television or a computer. Also, the automated systems for analyzing the metadata and/or generating one or more commands prohibiting MGAs from accepting commands that would place them into an identified undesirable state can include expert systems, as well as artificial intelligence systems. All of the above variations and extensions could be implemented and practiced without departing from the spirit and scope of the present invention as defined by the appended claims.

The invention claimed is:

1. A system for ensuring media device stability, the system comprising:
    a plurality of media devices, wherein each of said media devices, upon recovering from an unstable state that required the media device to restart, is adapted to collect metadata representative of the state and operation of the recovered media device prior to the media device becoming unstable;
    at least one repository comprising at least one memory and at least one processor; and
    at least one network linking the repository to the plurality of media devices;
    wherein the at least one processor is adapted to:
        receive, via the at least one network, a plurality of information transmissions, each of which originated from one of the plurality of media devices and comprises the collected metadata;
        store the received plurality of information transmissions in the at least one memory;
        analyze, upon determining that information transmissions have been received from a predetermined percentage of the plurality of media devices, the information within each received information transmission to identify commonalities;
        identify the state of the media devices associated with the identified commonalities;

generate a command prohibiting each of the plurality of media devices from entering the identified state; and
transmit the generated command to the plurality of media devices via the at least one network.

2. The system of claim 1 wherein each of the plurality of media devices comprises at least one of the following:
a set-top box;
a television; and
a computer.

3. The system of claim 1 wherein the predetermined number of unique media devices is a fixed number.

4. The system of claim 1 wherein the at least one repository comprises at least one of the following:
a networked server;
a headend; and
a cloud-based system.

5. The system of claim 1 wherein the command prohibiting each of the plurality of media devices from entering the identified state further comprises information to instruct each of the plurality of media devices to generate a message upon at least one display associated with each of the plurality of media devices indicative of the prohibition of the identified state.

6. The system of claim 5 wherein the at least one display comprises a television.

7. The system of claim 5 wherein the message is generated in response to a user attempting to place at least one of the plurality of media devices into the identified state.

8. The system of claim 1 wherein each of the plurality of information transmissions comprises metadata.

9. The system of claim 8 wherein the metadata comprises information indicative of at least one of the following:
content being recorded;
data being received;
content being retrieved and played;
commands received from a user;
commands received from a multiservice operator;
content being received via one or more tuners;
the type of content type being streamed, accessed, played or recorded;
the bit rate of content being streamed accessed, played or recorded; and
data anomalies.

10. A method for ensuring media device stability, in a system comprising:
a plurality of media devices, wherein each of said media devices, upon recovering from an unstable state that required the media device to restart, is adapted to collect metadata representative of the state and operation of the recovered media device prior to the media device becoming unstable;
at least one repository comprising at least one memory and at least one processor; and
at least one network linking the repository to the plurality of media devices;
the method comprising the steps of:
receiving, via the at least one network, a plurality of information transmissions, each of which originated from one of the plurality of media devices and comprises the collected metadata;
storing the received plurality of information transmissions in the at least one memory;
analyzing, upon determining that information transmissions have been received from a predetermined percentage of the plurality of media devices, the information within each received information transmission to identify commonalities;
identifying the state of the media devices associated with the identified commonalities;
generating a command prohibiting each of the plurality of media devices from entering the identified state; and
transmitting the generated command to the plurality of media devices via the at least one network.

11. The method of claim 10 wherein each of the plurality of media devices comprises at least one of the following:
a set-top box;
a television; and
a computer.

12. The method of claim 10 wherein the predetermined number of unique media devices is a fixed number.

13. The method of claim 10 wherein the at least one repository comprises at least one of the following:
a networked server;
a headend; and
a cloud-based system.

14. The method of claim 10 wherein the command prohibiting each of the plurality of media devices from entering the identified state further comprises information to instruct each of the plurality of media devices to generate a message upon at least one display associated with each of the plurality of media devices indicative of the prohibition of the identified state.

15. The method of claim 14 wherein the at least one display comprises a television.

16. The method of claim 14 wherein the message is generated in response to a user attempting to place at least one of the plurality of media devices into the identified state.

17. The method of claim 10 wherein each of the plurality of information transmissions comprises metadata.

18. The method of claim 17 wherein the metadata comprises information indicative of at least one of the following:
content being recorded;
data being received;
content being retrieved and played;
commands received from a user;
commands received from a multiservice operator;
content being received via one or more tuners;
the type of content type being streamed, accessed, played or recorded;
the bit rate of content being streamed accessed, played or recorded; and
data anomalies.

* * * * *